(12) United States Patent
Hidaka

(10) Patent No.: US 9,222,540 B2
(45) Date of Patent: Dec. 29, 2015

(54) SHOCK ABSORBER

(71) Applicant: FUJITSU LIMITED, Kawasaki-shi, Kanagawa (JP)

(72) Inventor: Hiroshi Hidaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 14/086,544

(22) Filed: Nov. 21, 2013

(65) Prior Publication Data

US 2014/0210147 A1   Jul. 31, 2014

(30) Foreign Application Priority Data

Jan. 31, 2013   (JP) ................... 2013-017098

(51) Int. Cl.
  *F16F 13/06* (2006.01)
(52) U.S. Cl.
  CPC ...................... *F16F 13/06* (2013.01)
(58) Field of Classification Search
  CPC .................. F16F 13/06; F16F 13/08
  USPC .............. 267/199, 25, 30, 140.11, 277, 242
  See application file for complete search history.

(56) References Cited

U.S. PATENT DOCUMENTS

| 4,474,271 A * | 10/1984 | Molders et al. ............. 188/280 |
| 4,687,463 A * | 8/1987 | Simonnet ..................... 494/83 |
| 4,732,407 A * | 3/1988 | Oyama et al. ............. 280/5.523 |
| 6,155,391 A * | 12/2000 | Kashiwagi et al. ......... 188/266.6 |
| 2005/0217918 A1 * | 10/2005 | Endo .............................. 180/291 |
| 2006/0071379 A1 * | 4/2006 | Kato et al. ................ 267/140.11 |
| 2008/0315473 A1 * | 12/2008 | Nishimae et al. ........ 267/140.11 |
| 2009/0166939 A1 * | 7/2009 | Goudie et al. ............ 267/140.12 |
| 2009/0179360 A1 * | 7/2009 | Quinn et al. ............. 267/140.11 |
| 2011/0210525 A1 * | 9/2011 | Michel .......................... 280/5.5 |
| 2012/0018934 A1 * | 1/2012 | Igarashi et al. ........... 267/140.11 |
| 2012/0091639 A1 * | 4/2012 | Lee et al. .................. 267/140.11 |
| 2012/0153551 A1 * | 6/2012 | Kolb ......................... 267/140.4 |

FOREIGN PATENT DOCUMENTS

| JP | 62-289408 | 12/1987 |
| JP | 5-17286 | 5/1993 |
| JP | 6-79610 | 11/1994 |
| JP | 7-22142 | * 4/1995 |
| JP | 7-46253 | 10/1995 |
| JP | 2002-199917 | 7/2002 |

* cited by examiner

*Primary Examiner* — Robert A Siconolfi
*Assistant Examiner* — Charles Poon
(74) *Attorney, Agent, or Firm* — Staas & Halsey LLP

(57) ABSTRACT

A shock absorber includes a shock absorbing member being to be rotated around an axis and having an outer circumferential surface being in contact with an end portion of a member that moves back and forth with respect to the shock absorbing member, the shock absorbing member having at least one of elasticity and viscosity against an movement of the member, each of the elasticity and viscosity changing in accordance with a rotation angle of the shock absorbing member around the axis, and a device that changes the rotation angle of the shock absorbing member to adjust at least one of the elasticity and the viscosity against the member.

10 Claims, 17 Drawing Sheets

-90 ROTATED     INITIAL POSITION     +90 ROTATED

-90 ROTATED  INITIAL POSITION  +90 ROTATED

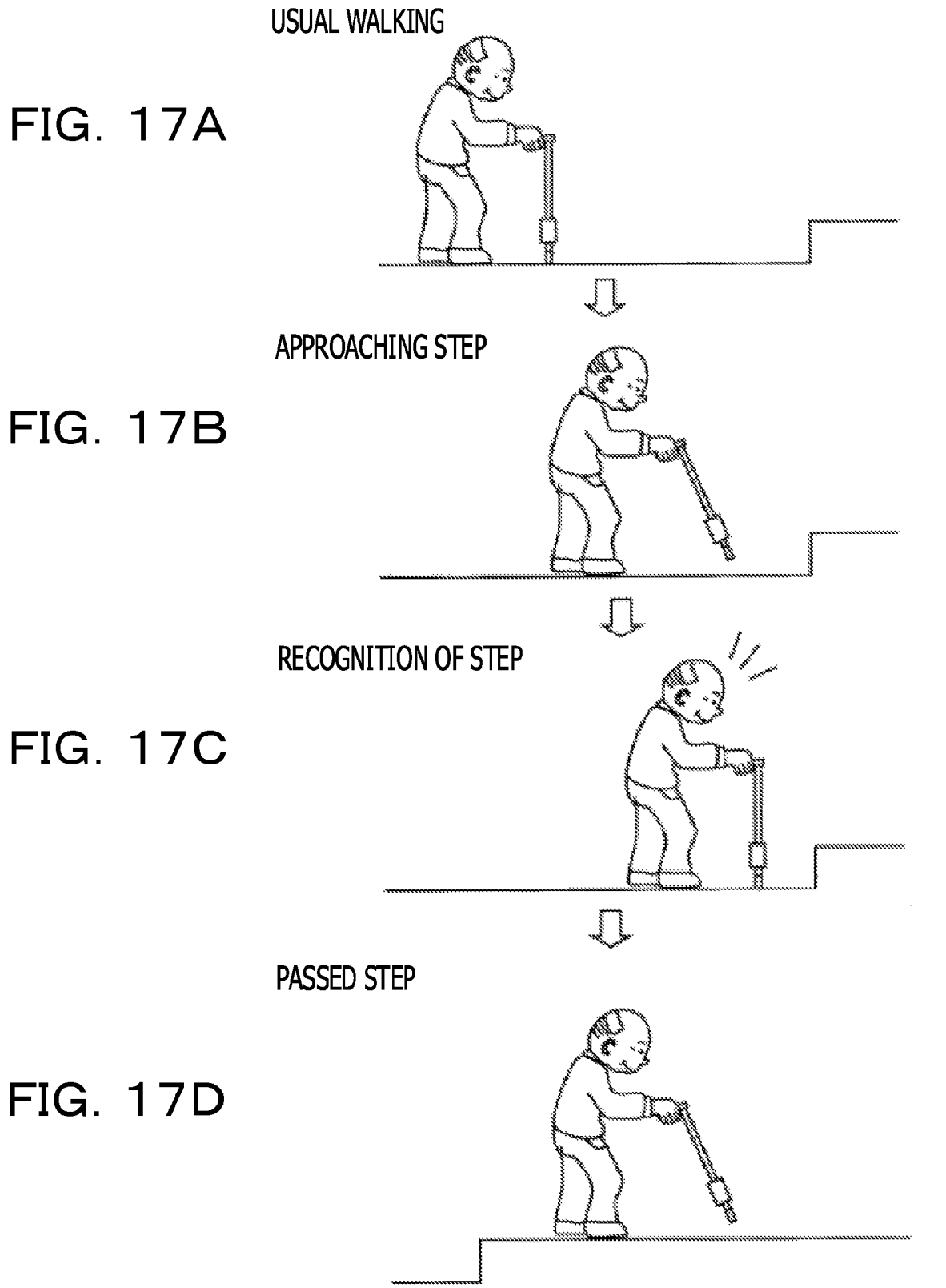

SHOCK ABSORBER

CROSS-REFERENCE TO RELATED APPLICATION

This application is based upon and claims the benefit of priority from the prior Japanese Patent Application No. 2013-017098 filed on Jan. 31, 2013, the entire contents of which are incorporated herein by reference.

FIELD

The embodiment discussed herein is related to a shock absorber.

BACKGROUND

The shock absorber is one of a variety of machine elements and absorbs shocks. Shock absorbers are applied to, for example, suspensions of automobiles (see, for example, Japanese Laid-open Utility Model Publication No. 6-79610, Japanese Laid-open Patent Publication No. 62-289408, Japanese Examined Utility Model Publication No. 5-17286), walking sticks used as an aid in walking (see, for example, Japanese Laid-open Patent Publication No. 2002-199917), and the like. Recently, a walking stick in which an electronic device is incorporated has been proposed (see, for example, Japanese Examined Utility Model Publication No. 7-46253).

SUMMARY

According to an aspect of the invention, a shock absorber includes a shock absorbing member being to be rotated around an axis and having an outer circumferential surface being in contact with an end portion of a member that moves back and forth with respect to the shock absorbing member, the shock absorbing member having at least one of elasticity and viscosity against an movement of the member, each of the elasticity and viscosity changing in accordance with a rotation angle of the shock absorbing member around the axis, and a device that changes the rotation angle of the shock absorbing member to adjust at least one of the elasticity and the viscosity against the member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 17A to 17D are examples of drawings illustrating the user of the walking stick who is approaching a step, which is an example of the position of caution.

DESCRIPTION OF EMBODIMENT

In some cases, shock absorbers, the shock absorbing characteristics of which such as elasticity and viscosity are dynamically changeable, are demanded. For example, suspensions for some automobiles may use active suspensions so as to reduce shocks transmitted to the car bodies. However, with some of related-art mechanisms that dynamically change shock absorbing characteristics, components and control methods become complex, motive power such as electrical power or hydraulic pressure is constantly used, or a larger space is occupied.

An embodiment will be described below. It is to be understood that the embodiment described hereafter is merely an example, and the technical scope of the present application is not limited to the forms described below.

Embodiment of Shock Absorber

Figure 1:
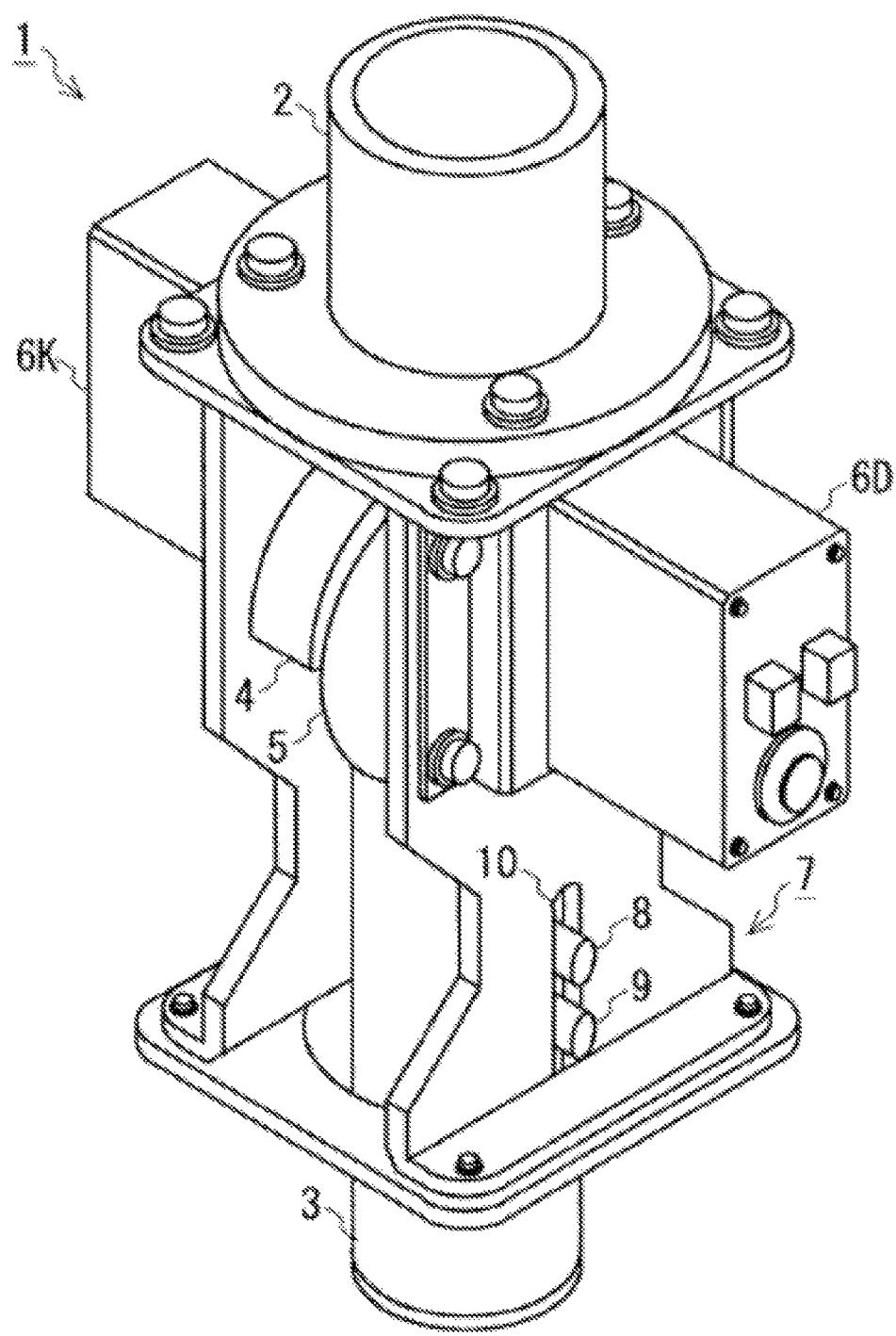
FIG. 1 is an example of a drawing of a shock absorber according to an embodiment.

FIG. 1 is an example of a drawing of a shock absorber according to an embodiment. A shock absorber 1 absorbs shock transmitted between a first member 2 and a second member 3. The shock absorber 1 includes an elastic member 4 (a form of a "shock absorbing member" referred to herein) and a viscous member 5 (a form of a "shock absorbing member" referred to herein). The elastic member 4 absorbs shock transmitted between the first member 2 and the second member 3. The viscous member 5 damps the displacement of the first member 2 and the second member 3 relative to each other, the displacement being changed due to shocks to which the first member 2 and the second member 3 are subjected. The shock absorber 1 also includes a servo device 6K (a form of the "characteristic adjusting mechanism" referred to herein and corresponds to an example of an "elasticity adjusting mechanism" referred to herein). The servo device 6K allows a relative attachment angle at which the elastic member 4 is attached in the shock absorber 1 to be changed by rotating the elastic member 4, which is formed to have a substantially arc shape, about the axis of the elastic member 4. The shock absorber 1 also includes a servo device 6D (a form of the "characteristic adjusting mechanism" referred to herein and corresponds to an example of a "viscosity adjusting mechanism" referred to herein). The servo device 6D allows a relative attachment angle at which the viscous member 5 is attached in the shock absorber 1 to be changed by rotating the viscous member 5, which is formed to have a substantially circular shape, about the axis of the viscous member 5.

The shock absorber 1 is secured to the first member 2. The shock absorber 1 also includes a holder 7 that holds the second member 3. The holder 7 has a hole 10, into which protrusions 8 and 9 provided in the second member 3 are fitted. The elongated hole 10 extends in a direction in which the shock is transmitted between the first member 2 and the second member 3. The hole 10 has a length that is sufficient to allow the protrusions 8 and 9 to slide in the hole 10 in the longitudinal direction the hole 10. Thus, upon reception of the shock transmitted between the first member 2 and the second member 3, the second member 3 moves along the hole 10, moving toward or away from the elastic member 4 and the viscous member 5.

The length of the hole 10 in the longitudinal direction regulates the amount by which the first member 2 and the second member 3 are displaceable relative to each other. Thus, the length of the hole 10 in the longitudinal direction is usually determined in accordance with an estimated magnitude of the shock. The forms of the holder 7 is not limited to the form in which the holder 7 holds the second member 3 through the protrusions 8 and 9 fitted into the hole 10 and may be changed to any of a variety of forms.

Figure 2:
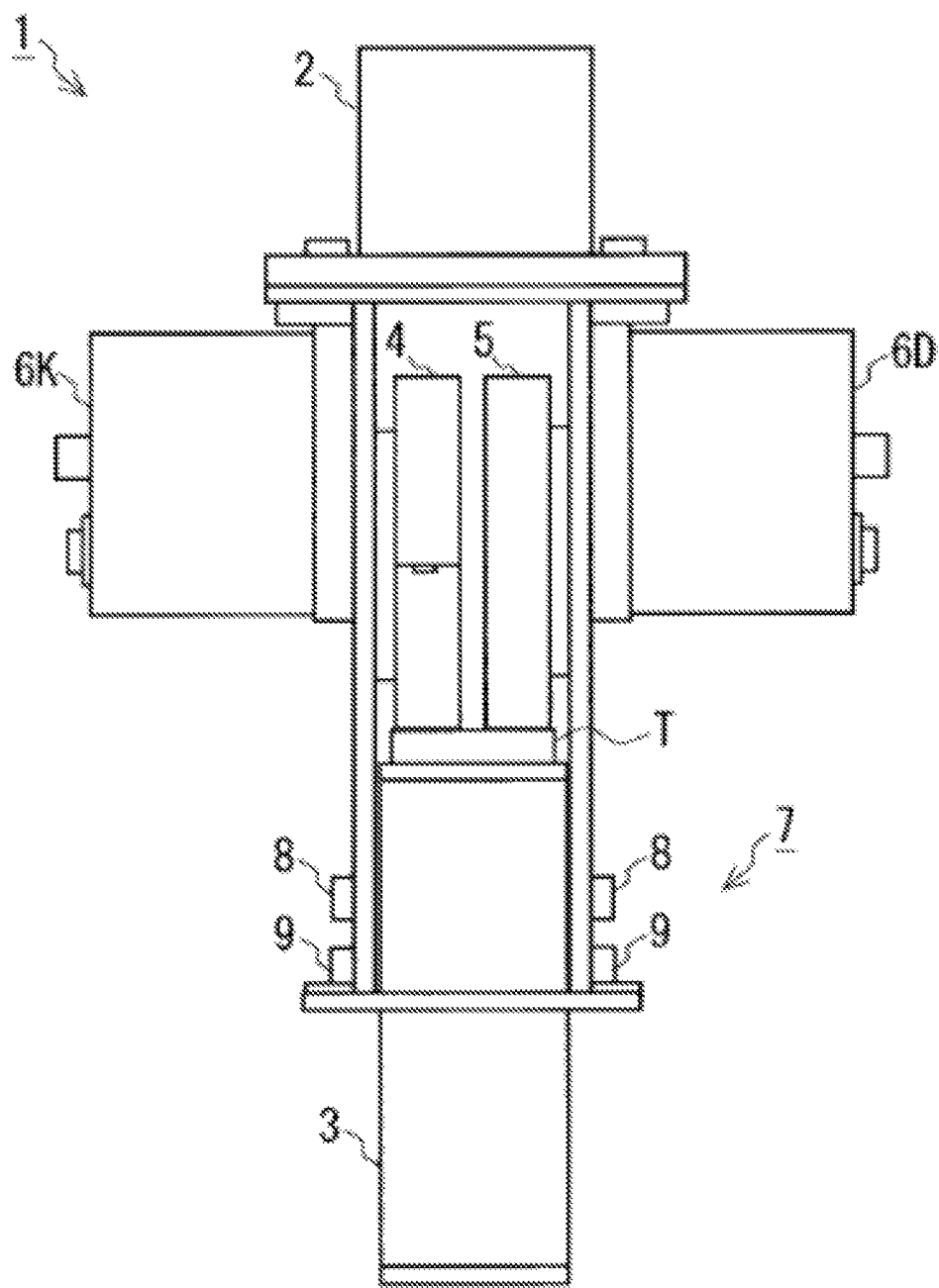
FIG. 2 is an example of a drawing illustrating a state in which an elastic member and a viscous member are in contact with a second member.

FIG. 2 is an example of a drawing illustrating a state in which the elastic member and the viscous member are in contact with the second member. An end portion T of the second member 3 is in contact with outer circumferential surfaces of the elastic member 4 and the viscous member 5. The elastic member 4 has a substantially arc shape and the viscous member 5 has a substantially circular shape. Even when a load is not applied between the first member 2 and the second member 3, the end portion T of the second member 3 is still in contact with the outer circumferential surfaces of the elastic member 4 and the viscous member 5. Thus, a situation does not occur, in which the second member 3 freely moves relative to the first member 2 along the hole 10 while not pressing the outer circumferential surfaces of the elastic member 4 and the viscous member 5. When a shock transmitted between the first member 2 and the second member 3 is generated, the end portion T of the second member 3 immediately presses the outer circumferential surfaces of the elastic member 4 and the viscous member 5.

Figure 3:
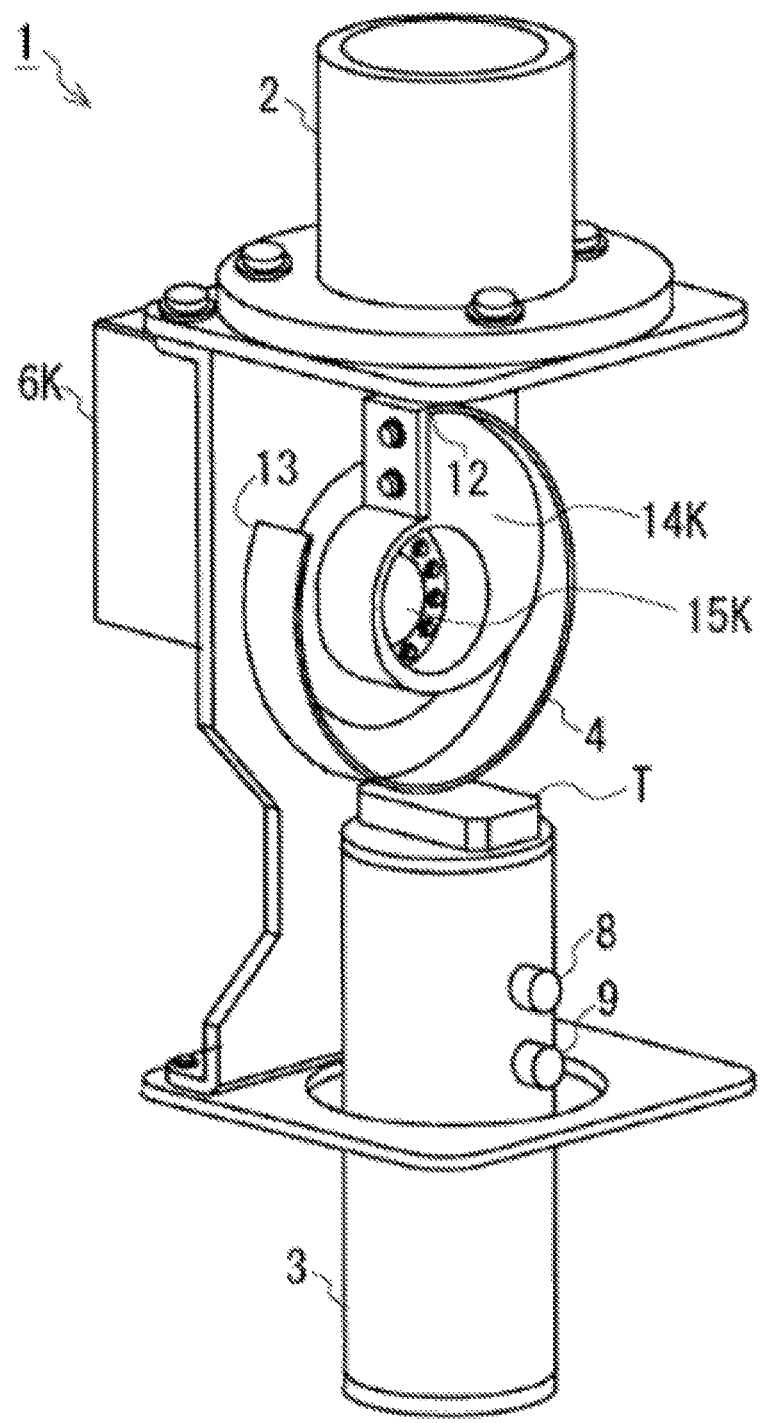
FIG. 3 is an example of a drawing illustrating a state in which the elastic member and the second member are in contact with each other.

FIG. 3 is an example of a drawing illustrating a state in which the elastic member and the second member are in contact with each other. The elastic member 4 has a substantially arc shape and has an arc-shaped plate spring 11. The outer circumferential surface of the elastic member 4 is defined by a plate surface of the plate spring 11, one end of which is secured to a shaft portion 14K. Thus, the elastic modulus exhibited by the elastic member 4 increases as a portion of the outer circumferential surface of the elastic member 4 in contact with the end portion T of the second member 3 moves closer to a fixed end 12, and the elastic modulus decreases as this portion of the elastic member 4 moves closer to a free end 13. In the shock absorber 1 according to the present embodiment, the elastic member 4 is attached to a drive shaft 15K of the servo device 6K so as to allow the attachment angle of the elastic member 4 to be changeable, thereby allowing a contact position of the outer circumferential surface of the elastic member 4 in contact with the end portion T of the second member 3 to be changed. Thus, the substantial elastic modulus exhibited by the elastic member 4 becomes changeable. The elastic member 4 may be formed of, for example, a stainless steel, a spring steel, or the like.

Figure 4A:
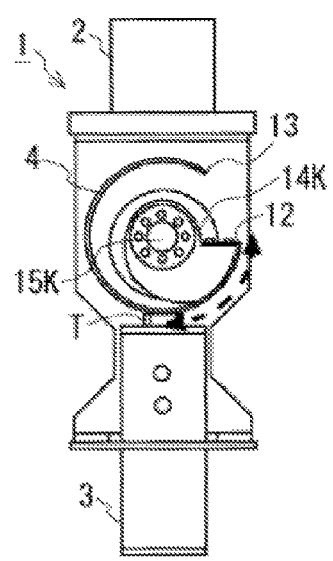
FIGS. 4A to 4C are examples of drawings that allow the comparison of the length along an outer circumferential surface between a fixed end and a portion of the outer circumferential surface of the elastic member in contact with an end portion T of the second member when an attachment angle of the elastic member is changed by plus and minus 90°.
Figure 4B:
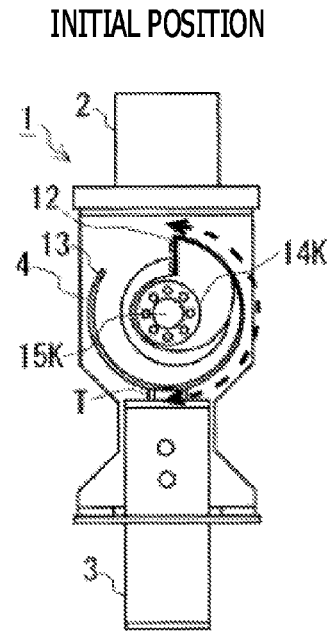
Figure 4C:
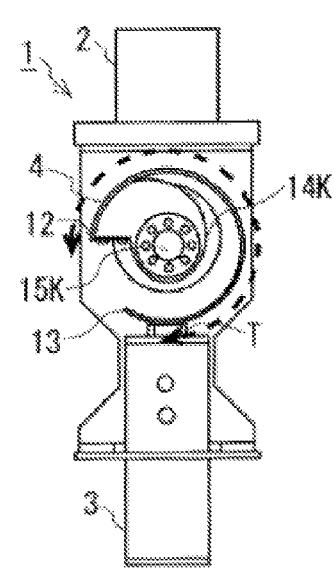

FIGS. 4A to 4C are examples of drawings that allow the comparison of the length along the outer circumferential surface between the fixed end and the portion of the outer circumferential surface of the elastic member in contact with the end portion T of the second member when the attachment angle of the elastic member is changed by plus and minus 90°. For example, assuming that the attachment angle of the elastic member 4 is changed so as to change a state illustrated as the "INITIAL POSITION" in FIG. 4B to a state illustrated as the "−90° ROTATED" in FIG. 4A. In this case, as illustrated by broken lines in FIGS. 4A and 4B, the length along the outer circumferential surface between the fixed end 12 and the portion of the outer circumferential surface of the elastic member 4 in contact with the end portion T of the second member 3 is reduced. Thus, the substantial elastic modulus exhibited by the elastic member 4 increases when the second member 3 is subjected to a shock and moves toward or away from the shaft portion 14K. For example, assuming that the attachment angle of the elastic member 4 is changed so as to change the state illustrated as the "INITIAL POSITION" in FIG. 4B to a state illustrated as the "+90°ROTATED" in FIG. 4C. In this case, as illustrated by broken lines in FIGS. 4B and 4C, the length along the outer circumferential surface between the fixed end 12 and the portion of the outer circumferential surface of the elastic member 4 in contact with the end portion T of the second member 3 is increased. Thus, the substantial elastic modulus exhibited by the elastic member 4 reduces when the second member 3 is subjected to a shock and moves toward or away from the shaft portion 14K.

Figure 5:
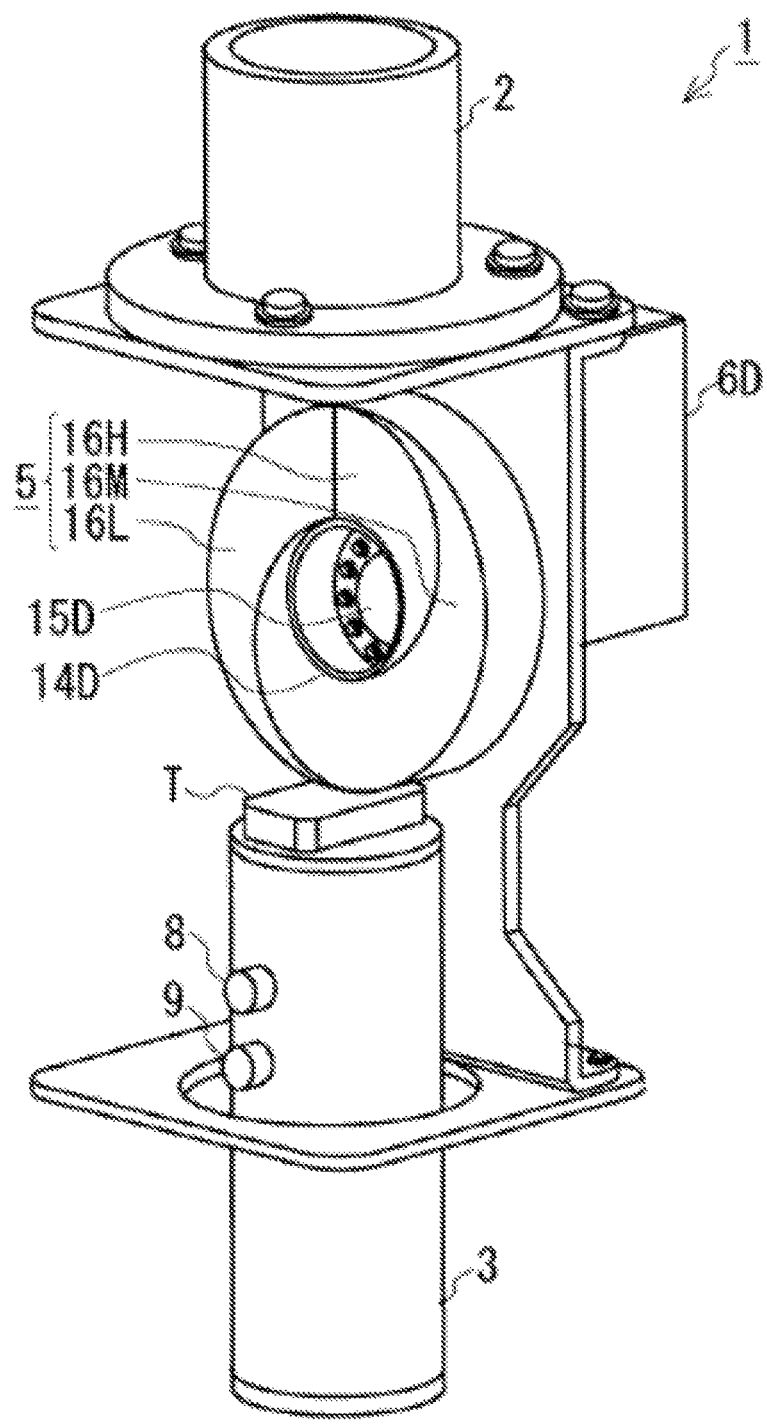
FIG. 5 is an example of a drawing illustrating a state in which a viscous member and the second member are in contact with each other.

FIG. 5 is an example of a drawing illustrating a state in which the viscous member and the second member are in contact with each other. The viscous member 5 is formed to have a circular shape by combining viscous materials 16H, 16M, and 16L with one another. The viscous materials 16H, 16M, and 16L have respective hardnesses different from one another. The viscous member 5 is usually formed of a material having low repulsive property exhibiting low repulsive power (for example, a low repulsion urethane, a low elasticity rubber, or the like). The viscous member 5 is formed by combining the viscous materials 16H, 16M, and 16L with one another, the hardness of which is reducing in this order. The viscous materials 16H, 16M, and 16L are partly superposed with one another so that the hardness of the viscous member 5 is gradually changed as the viscous member 5 is rotated around a shaft portion 14D. Thus, the viscosity coefficient exhibited by the viscous member 5 increases as a portion of the outer circumferential surface of the viscous member 5 in contact with the end portion T of the second member 3 is transitioned from the viscous material 16L side to the viscous material 16H side, and the viscosity coefficient reduces as this portion of the outer circumferential surface of the viscous member 5 is transitioned from the viscous material 16H side to the viscous material 16L side. In the shock absorber 1 according to the present embodiment, the viscous member 5 is attached to a drive shaft 15D of the servo device 6D so as to allow the attachment angle of the viscous member 5 to be changeable, thereby allowing a contact position of the outer circumferential surface of the viscous member 5 in contact with the end portion T of the second member 3 to be changed. Thus, the substantial viscosity coefficient exhibited by the viscous member 5 becomes changeable.

Figure 6A:
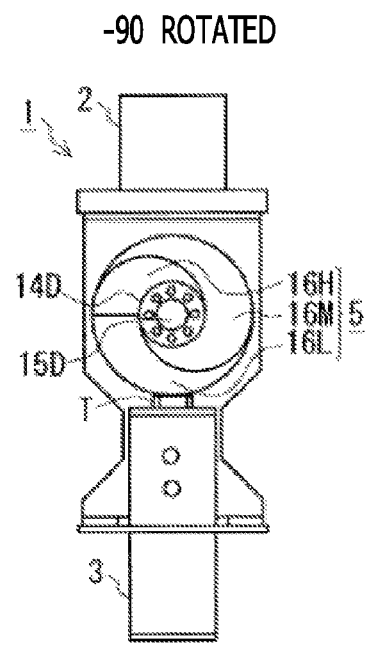
FIGS. 6A to 6C are examples of drawings that allow the comparison of the viscous materials interposed between the shaft portion and a portion of an outer circumferential surface of the viscous member in contact with the end portion T of the second member when an attachment angle of the viscous member is changed by plus and minus 90°.
Figure 6B:
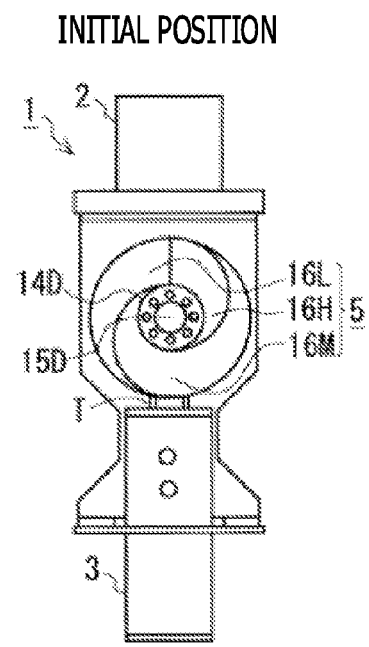
Figure 6C:
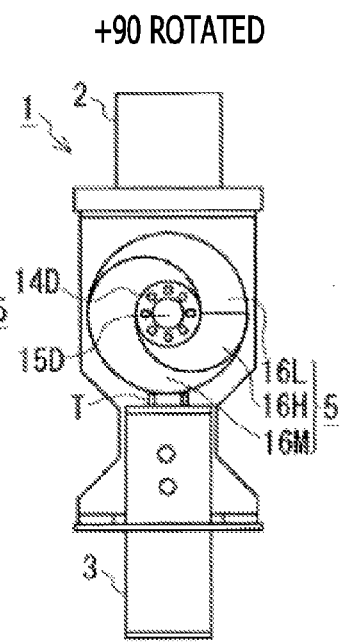

FIGS. 6A to 6C are examples of drawings that allow the comparison of the viscous materials interposed between the shaft portion and the portion of the outer circumferential surface of the viscous member in contact with the end portion T of the second member when the attachment angle of the viscous member is changed by plus and minus 90°. In a state illustrated as the "INITIAL POSITION" in FIG. 6B, a space between the shaft portion 14D and the portion of the outer circumferential surface of the viscous member 5 in contact with the end portion T of the second member 3 is entirely occupied by the viscous material 16M. Here, for example, assuming that the attachment angle of the viscous member 5 is changed so as to change the state illustrated as the "INITIAL POSITION" in FIG. 6B to a state illustrated as the "−90°ROTATED" in FIG. 6A. In this case, as illustrated in FIG. 6A, the space between the shaft portion 14D and the portion of the outer circumferential surface of the viscous member 5 in contact with the end portion T of the second member 3 is equally occupied by the viscous materials 16L and 16M. That is, in comparison with the state illustrated as "INITIAL STATE" in FIG. 6B, the hardness of the entirety of the viscous materials, which occupy the space between the shaft portion 14D and the portion of the outer circumferential surface of the viscous member 5 in contact with the end portion T of the second member 3, is reduced in the state illustrated as the "−90° ROTATED" in FIG. 6A. Thus, in comparison with the state illustrated as the "INITIAL STATE" in FIG. 6B, the substantial viscosity coefficient exhibited by the viscous member 5 reduces when the second member 3 is subjected to a shock and moves toward or away from the shaft portion 14D in the state illustrated as the "−90° ROTATED" in FIG. 6A. For example, assuming that the attachment angle of the viscous member 5 is changed so as to change the state illustrated as the "INITIAL POSITION" in FIG. 6B to a state illustrated as the "+90° ROTATED" in FIG. 6C. In this case, as illustrated in FIG. 6C, the space between the shaft portion 14D and the portion of the outer circumferential surface of the viscous member 5 in contact with the end portion T of the second member 3 is equally occupied by the viscous materials 16H and 16M. That is, in comparison with the state illustrated as the "INITIAL STATE" in FIG. 6B, the hardness of the entirety of the viscous materials, which occupy the space between the shaft portion 14D and the portion of the outer circumferential surface of the viscous member 5 in contact with the end portion T of the second member 3, is increased in the state illustrated as the "+90° ROTATED" in FIG. 6C. Thus, in comparison with the state illustrated as the "INITIAL STATE" in FIG. 6B, the substantial viscosity coefficient exhibited by the viscous member 5 increases when the second member 3 is subjected to a shock and moves toward or away from the shaft portion 14D in the state illustrated as the "+90° ROTATED" in FIG. 6C.

The attachment angles of the elastic member 4 and the viscous member 5 are not necessarily changed at a 90° interval. The interval angle may be steplessly changed.

Furthermore, regarding the attachment angles of the elastic member 4 and the viscous member 5, for example, the correlations between the elastic modulus and viscosity coefficient and the attachment angle may be defined in a map, which is stored in a memory or the like to be referred to by a controller that performs control of the servo devices 6K and 6D. With the map in which the correlations between the elastic modulus and viscosity coefficient and the attachment angle are defined, the controller may adjust the attachment angles of the elastic member 4 and the viscous member 5 so that the shock absorber 1 exhibits specified elasticity and viscosity.

Furthermore, regarding the attachment angles of the elastic member 4 and the viscous member 5, for example, the correlations between various conditions and the attachment angle may be defined in a map, which is stored in a memory or the like to be referred to by the controller that performs control of the servo devices 6K and 6D. With the map in which the attachment angle is defined for each condition that triggers a change in the attachment angle, the attachment angles of the elastic member 4 and the viscous member 5 may be adjusted so that the shock absorber 1 exhibits elasticity and viscosity in accordance with the various conditions.

Regarding the attachment angles of the elastic member 4 and the viscous member 5, for example, the correlations between the elastic modulus and viscosity coefficient and the attachment angle may be defined by a computation expression, which is stored in a memory or the like so as to allow a controller that performs control of the servo devices 6K and 6D to calculate the attachment angle in accordance with the computation expression. With the computation expression by which the correlations between the elastic modulus and viscosity coefficient and the attachment angle are defined, the attachment angles of the elastic member 4 and the viscous member 5 may be adjusted so that the shock absorber 1 exhibits specified elasticity and viscosity.

Figure 7:
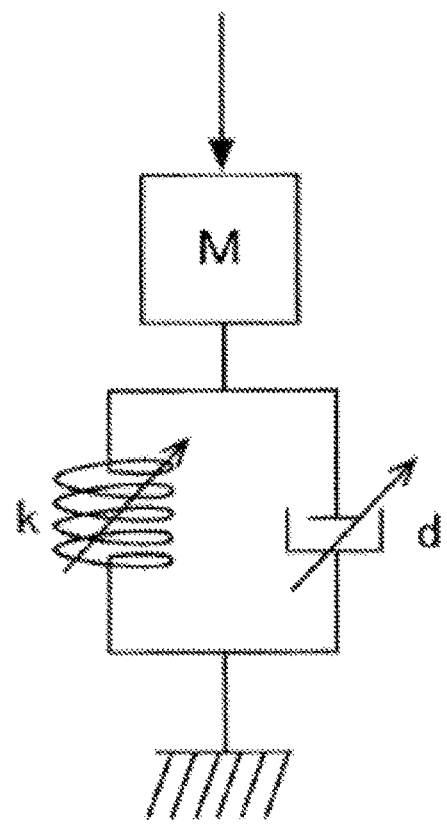
FIG. 7 is an example of a drawing illustrating an equivalent model of the shock absorber.

FIG. 7 is an example of a drawing illustrating an equivalent model of the shock absorber. Assuming that the second member 3 is grounded, the equivalent model of the shock absorber 1 is represented, for example, as that illustrated in FIG. 7. That is, since the outer circumferential surfaces of both the elastic member 4 and the viscous member 5 are in contact with the end portion T of the second member 3, the shock absorber 1 realizes a viscoelastic model on which the elastic force of the elastic member 4 and the viscous force of the viscous member 5 act. In the shock absorber 1, the elastic modulus is adjustable by changing the angle of the elastic member 4 with the servo device 6K, and the viscosity coefficient is adjustable by changing the angle of the viscous member 5 with the servo device 6D. Thus, the shock absorber 1 may realize a viscoelastic model, the elastic modulus and the viscosity coefficient of which are arbitrarily changeable by adjusting the angles of the elastic member 4 and the viscous member 5 through operation of the servo device 6K and the servo device 6D.

The characteristic of the shock absorber such as the elastic modulus or the viscosity coefficient of the shock absorber 1 is dynamically changeable only by changing the attachment angle of the circular or arc-shaped member through rotation of the circular or arc-shaped member. Thus, the shock absorber 1 is simply structured, space-saving, and easily controlled. Furthermore, motive power such as electrical power or hydraulic pressure is not used for the shock absorber 1 except when the elastic modulus or the viscosity coefficient is changed.

Alternatively, the shock absorber 1 may realize an elastic model, by omitting, for example, the viscous member 5 and the servo device 6D. In this case, only the elastic modulus is adjustable. Alternatively, the shock absorber 1 may realize a viscous model, by omitting, for example, the elastic member 4 and the servo device 6K. In this case, only the viscosity coefficient is adjustable.

Alternatively, the viscous member 5 of the shock absorber 1 may be formed by combining two types of viscous materials with each other or four or more types of viscous materials with one another. The viscous materials of the viscous member 5 of the shock absorber 1 are not necessarily superposed with one another. The viscous member 5 may be formed by combining sector-shaped viscous materials with one another.

The servo devices 6K and 6D of the shock absorber 1 may be omitted. In this case, the attachment angles of the elastic member 4 and the viscous member 5 are manually adjusted instead of using electricity.

In the shock absorber 1, in order to avoid application of overloads to the servo devices 6K and 6D, operation of the servo devices 6K and 6D may be regulated while a load is being applied between the first member 2 and the second member 3. Alternatively, loads applied to the servo devices 6K and 6D may be reduced by attaching a rotatable component such as a roller to the end portion T of the second member 3.

Variants of Shock Absorber

In the shock absorber 1, in order to use the viscous force also when the shape of the viscous member 5 having been deformed is restored to the shape before viscous member 5 was deformed, the end portion T of the second member 3 may be engaged with the outer circumferential surface of the viscous member 5.

Figure 8:
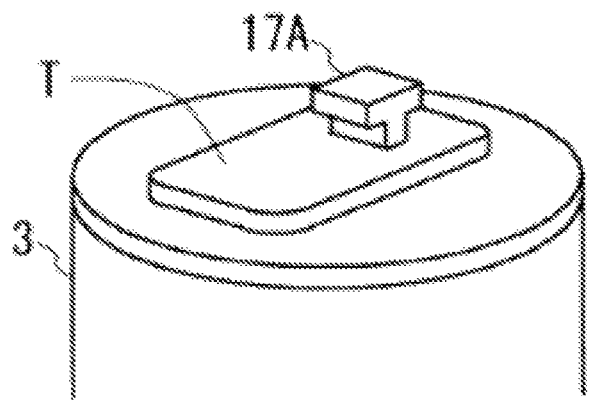
FIG. 8 is an example of a drawing illustrating an end portion of the second member according to a first variant.

FIG. 8 is an example of a drawing illustrating an end portion of the second member according to a first variant. In the first variant, a T-shaped engaging member 17A is provided on the end portion T of the second member 3. The engaging member 17A is engaged so as to use the viscous force also when the shape of the viscous member 5 having been deformed is restored to the shape before the viscous member 5 was deformed. Thus, the engaging member 17A has the degree of strength with which the engaging member 17A at least withstands the elastic force of the elastic member 4, the shape of which is immediately restored when the elastic member 4 is deformed.

Figure 9:
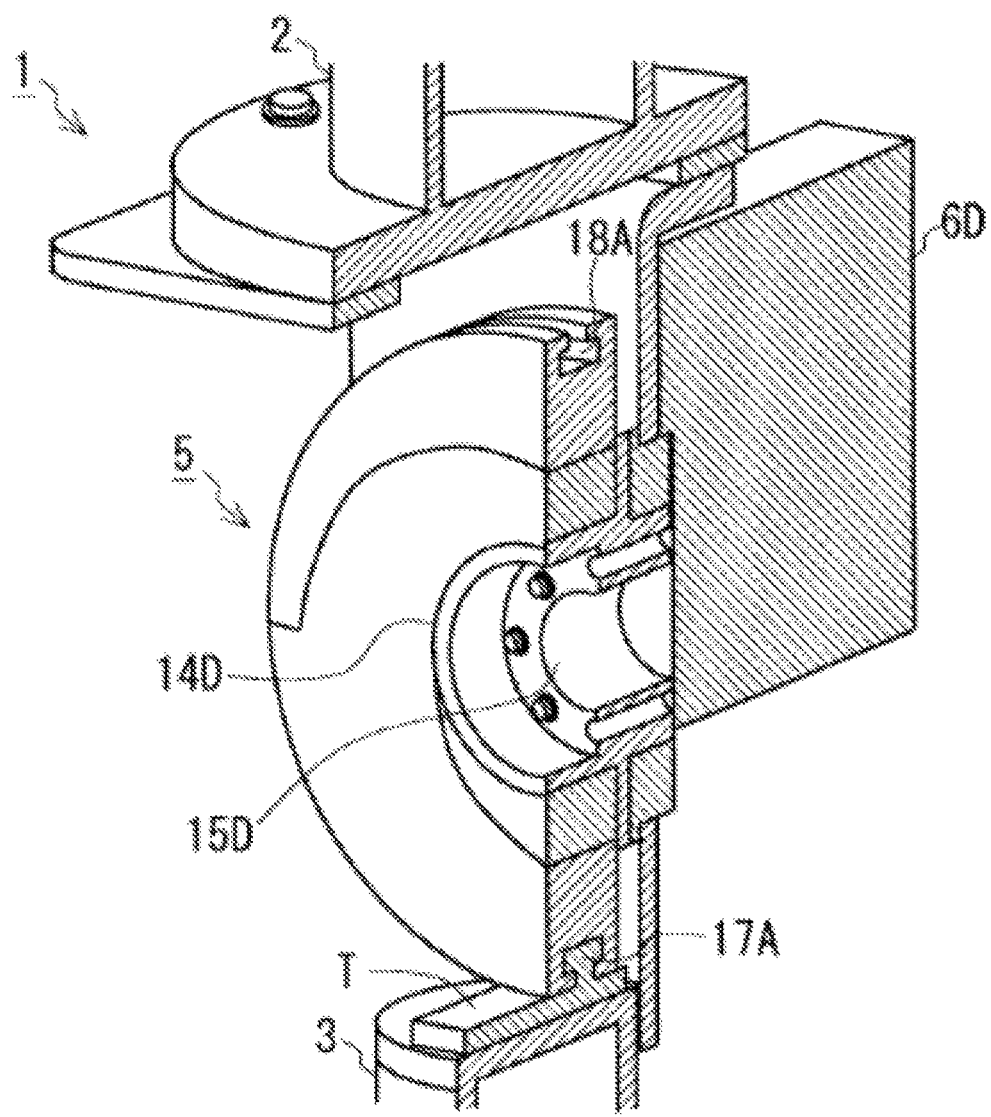
FIG. 9 is an example of a drawing illustrating a state in which the outer circumferential surface of the viscous member and the end portion of the second member according to the first variant are in contact with each other.

FIG. 9 is an example of a drawing illustrating a state in which the outer circumferential surface of the viscous member and the end portion of the second member according to the first variant are in contact with each other. In the first variant, an engaging groove 18A is provided in the outer circumferential surface of the viscous member 5. The engaging member 17A provided on the end portion T of the second member 3 is engaged with the engaging groove 18A. The engaging groove 18A is formed in the outer circumferential surface of the viscous member 5 through the entire circumference. The engaging member 17A is slidable along the engaging groove 18A. Thus, the servo device 6D may change the attachment angle of the viscous member 5 while the engaging member 17A is engaged with the engaged with the engaging groove 18A.

Figure 10:
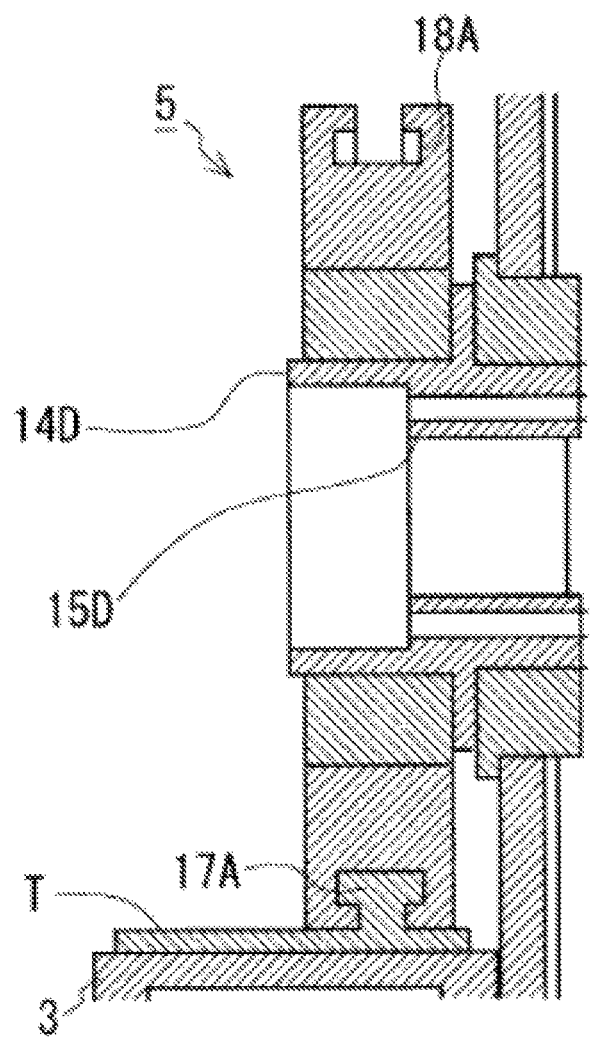
FIG. 10 is an example of a drawing illustrating a state in which an engaging member and an engaging groove according to the first variant are engaged with each other.

FIG. 10 is an example of a drawing illustrating a state in which the engaging member and the engaging groove according to the first variant are engaged with each other. In order to hold the T-shaped engaging member 17A in the viscous member 5, the size of the engaging groove 18A is smaller on an opening side than on a bottom side. Thus, even in a process in which the shape of the viscous member 5 having been deformed by a shock is being restored to the shape before the viscous member 5 was deformed, the engaged state is maintained without the end portion T of the second member 3 being separated from the outer circumferential surface of the viscous member 5, thereby allowing the viscous force of the viscous member 5 to continue to act.

Figure 11:
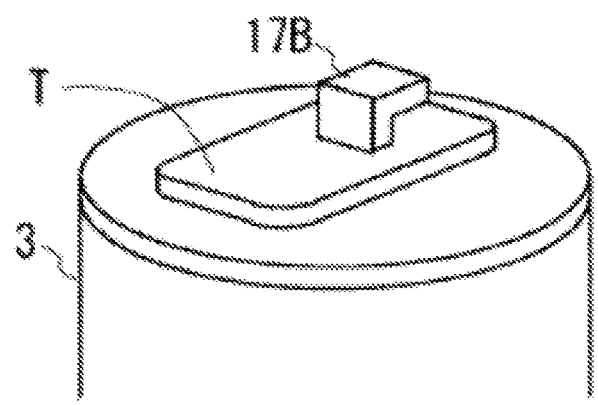
FIG. 11 is an example of a drawing illustrating an end portion of the second member according to a second variant.

FIG. 11 is an example of a drawing illustrating an end portion of the second member according to a second variant. In the second variant, an L-shaped engaging member 17B is provided on the end portion T of the second member 3. The engaging member 17B is engaged so as to use the viscous force also when the shape of the viscous member 5 having been deformed is restored to the shape before the viscous member 5 was deformed. Thus, the engaging member 17B has the degree of strength with which the engaging member 17B at least withstands the elastic force of the elastic member 4, the shape of which is immediately restored when the elastic member 4 is deformed.

Figure 12:
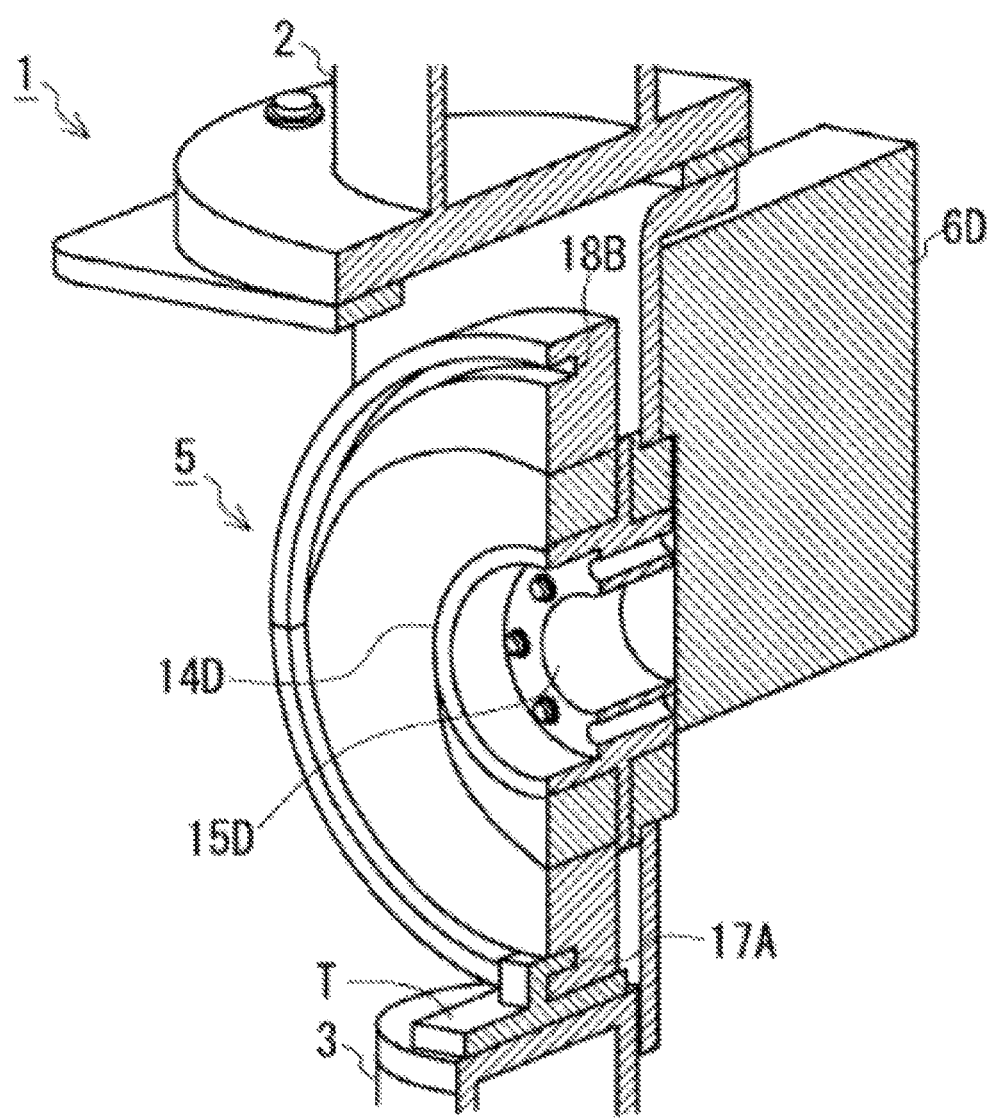
FIG. 12 is an example of a drawing illustrating a state in which the outer circumferential surface of the viscous member and the end portion of the second member according to the second variant are in contact with each other.

FIG. 12 is an example of a drawing illustrating a state in which the outer circumferential surface of the viscous member and the end portion of the second member according to the second variant are in contact with each other. In the second variant, an engaging groove 18B is provided in a lateral side surface of the outer circumferential surface in the viscous member 5. The engaging member 17B provided on the end portion T of the second member 3 is engaged with the engaging groove 18B.

The engaging groove 18B is formed along the outer circumferential surface of the viscous member 5 through the entire circumference. The engaging member 17B is slidable along the engaging groove 18B. Thus, the servo device 6D may change the attachment angle of the viscous member 5 while the engaging member 17B is engaged with the engaged with the engaging groove 18B.

Figure 13:
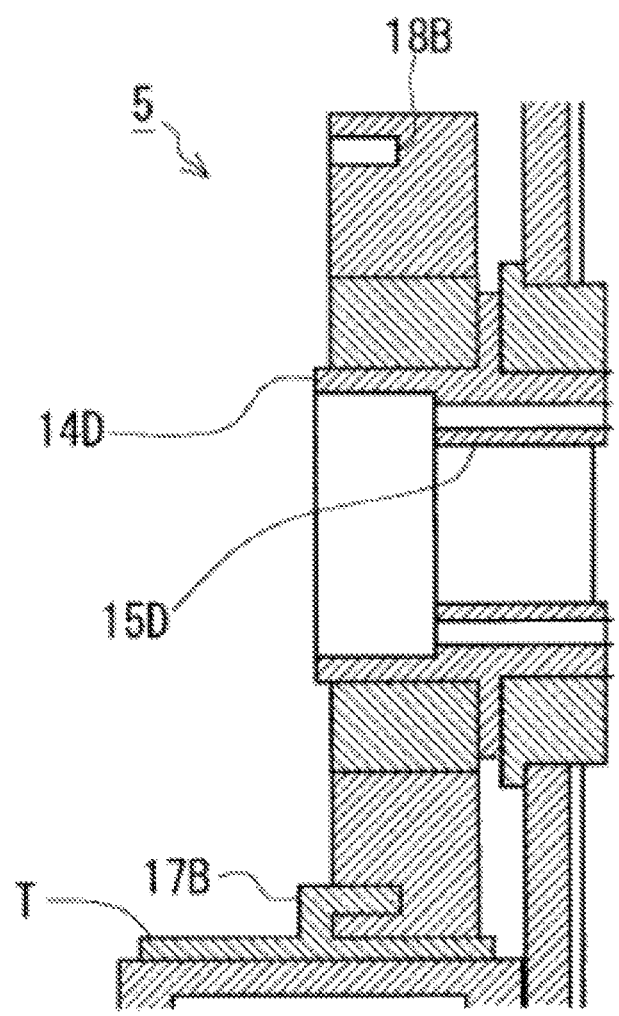
FIG. 13 is an example of a drawing illustrating a state in which an engaging member and an engaging groove according to the second variant are engaged with each other.

FIG. 13 is an example of a drawing illustrating a state in which the engaging member and the engaging groove according to the second variant are engaged with each other. In order to hold the L-shaped engaging member 17B in the viscous member 5, the engaging groove 18B is formed in the lateral side surface of the outer circumferential surface of the viscous member 5. The engaging groove 18A has a depth in a direction perpendicular to a direction in which the second member 3 moves back and forth. Thus, even in a process in which the shape of the viscous member 5 having been deformed by a shock is being restored to the shape before the viscous member 5 was deformed, the engaged state is maintained without the end portion T of the second member 3 being separated from the outer circumferential surface of the viscous member 5, thereby allowing the viscous force of the viscous member 5 to continue to act.

Application Example of Shock Absorber

Figure 14:
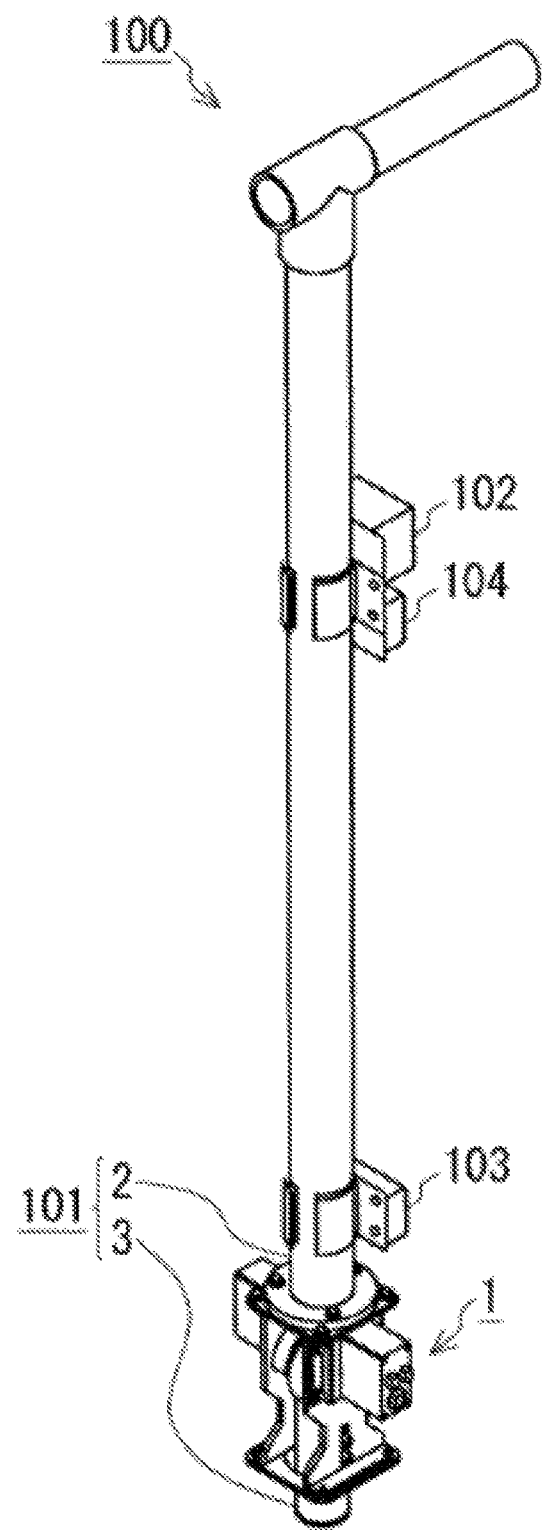
FIG. 14 is an example of a walking stick to which the shock absorber is applied.

The shock absorber 1 according to the above-described embodiment may be used as, for example, a device that notifies a user of various information. FIG. 14 is an example of a walking stick to which the shock absorber is applied. The shock absorber 1, which is small in size and simply structured, is applicable to, for example, a walking stick 100 as illustrated in FIG. 14 used as an aid in walking. The walking stick 100 according to the present application example includes a rod-shaped walking stick main body 101, a controller 102, a sensor 103, a battery 104, and the shock absorber 1 according to the above-described embodiment. In this case, the first member 2 of the above-described embodiment serves as a portion above the shock absorber 1 out of the walking stick main body 101, and is gripped by the user of the walking stick 100. The second member 3 of the above-described embodiment serves as a portion below the shock absorber 1 out of the walking stick main body 101, and is to be in contact with the ground.

Various information is provided for the user of the walking stick 100 by adjusting a manner in which shocks are transmitted to the user of the walking stick 100 when the walking stick 100 is in contact with the ground. For example, a pedestrian walking outdoor obtains various visual and auditory information while walking. However, eyesight and hearing may be failing, for example, as a person becomes older. Thus, the walking stick 100 provides various information through a tactile sense of a hand by adjusting how shocks are received by the hand that grips the walking stick 100, thereby compensating the functions of the sensory organs which are failing.

Examples of information transmitted to the user of the walking stick 100 through the tactile sense of the hand include, for example, location information by which a pedestrian whose eyesight is reduced is notified of the current location, warning information by which the user is notified that a vehicle or a bicycle is approaching the user or the user is approaching a position of caution with which it is desirable that the user be cautious, and route information by which the user is guided to a specified destination. Examples of the location information include, for example, information by which the user is notified of the existence of a pedestrian crossing, the information being such information as that provided by tactile paving on the ground, information by which the user is notified that the user is at a position where it is desirable that the user temporarily stop, and other location information.

Examples of ways of transmitting information through tactile sense of the hand include, for example, changes in the level of the shock transmitted to the user of the walking stick 100. For example, in order to transmit information by which the user is notified that the user is near a pedestrian crossing or the user is at a position where it is desirable that the user temporarily stop, the shock transmitted to the user by the walking stick 100 may be stronger than that in the case where there is no information transmitted to the user. Furthermore, for example, in order to transmit the warning information by which the user is notified that a vehicle or a bicycle is approaching the user, the shock transmitted to the user by the walking stick 100 may be stronger than that in the case where there is no warning information transmitted to the user. Furthermore, for example, in order to transmit the route information by which the user is guided to a specified destination, the shock transmitted to the user by the walking stick 100 when the user deviates from the route may be stronger than that in the case where the user is walking along the route. Information transmission through tactile sense of the hand is not limited to the above-described forms. Sensation of the shock may be changed to an elastic or viscous sensation when transmitting information.

Figure 15:
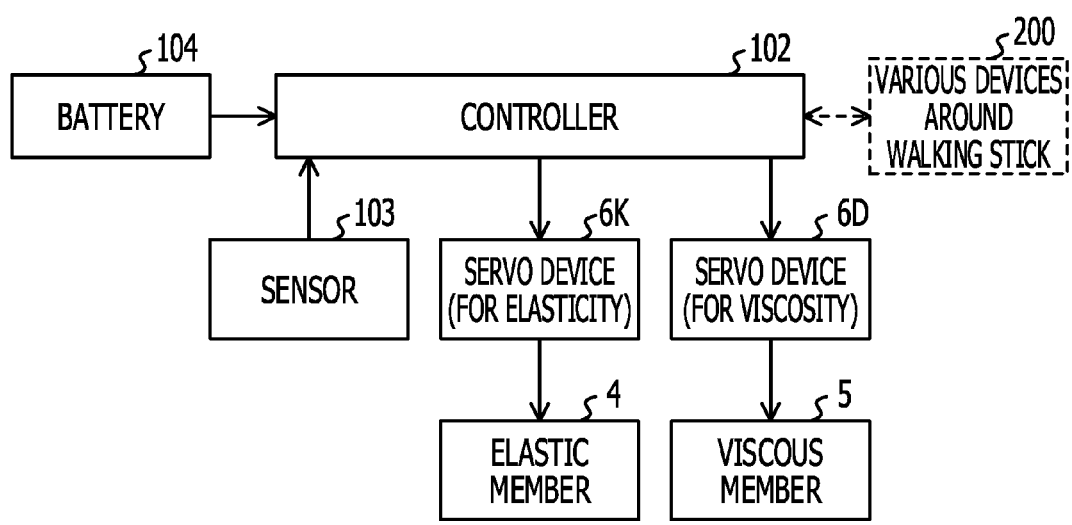
FIG. 15 is an example of a block diagram of a system that controls the shock absorber provided in the walking stick.

FIG. 15 is an example of a block diagram of a system that controls the shock absorber provided in the walking stick. The servo devices 6K and 6D of the shock absorber 1 may be, for example, connected to the controller 102 in accordance with the block diagram as illustrated in FIG. 15 and controlled by the controller 102. A communication line 105 may be connected to the controller 102 in order to obtain information in a contactless manner from the battery 104, the sensor 103, or various devices 200 located around the walking stick 100. The controller 102 may control the servo devices 6K and 6D with power supplied from the battery 104 so that, for example, the elasticity and the viscosity exhibited by the shock absorber 1 change in accordance with information obtained from the sensor 103 or the communication line 105.

Figure 16:
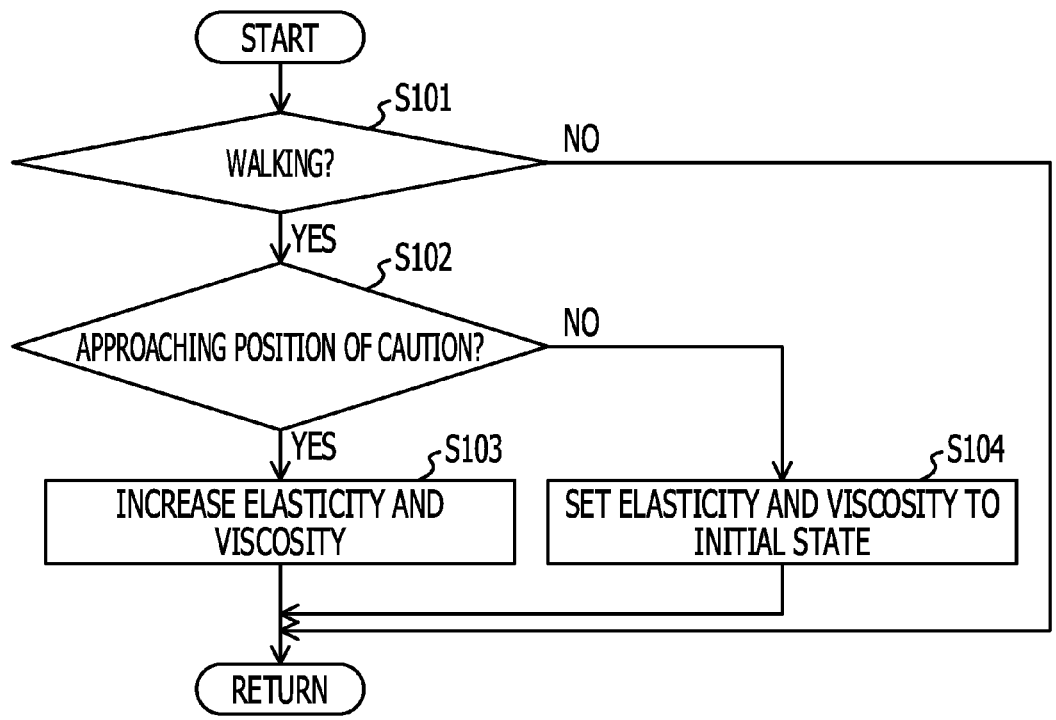
FIG. 16 is an example of a flowchart of a process realized by the controller when the walking stick functions as a device that notifies a user that the user is approaching a position of caution with which it is desirable that the user be cautious.

A process flow realized by the controller 102 is described below. This process flow is realized when the walking stick 100 functions as a device that notifies the user that, for example, the user is approaching a position of caution. FIG. 16 is an example of a drawing illustrating a flowchart of a process realized by the controller when the walking stick functions as a device that notifies the user that the user is approaching the position of caution. FIGS. 17A to 17D are examples of drawings illustrating the user of the walking stick who is approaching a step, which is an example of the position of caution.

The controller 102 monitors whether or not the user of the walking stick 100 is walking (S101). Any of a variety of forms may be used to monitor whether or not the user of the walking stick 100 is walking. For example, when the sensor 103 has a function of detecting acceleration, the controller 102 may determine whether or not the user of the walking stick 100 is walking in accordance with acceleration information from the sensor 103. For example, when the sensor 103 has a function of obtaining location information by performing positioning in accordance with radio waves from a satellite, the controller 102 may determine whether or not the user of the walking stick 100 is walking in accordance with the location information from the sensor 103.

When the controller 102 detects that the user of the walking stick 100 is walking (a state illustrated in FIG. 17A as "USUAL WALKING"), the controller 102 monitors whether or not the user is approaching the position of caution (S102). Any of a variety of forms may be used to monitor whether or not the user is approaching the position of caution. For example, when a device is installed at or near the position of caution and the device sends a notification of the existence of the position of caution to a region therearound through contactless communication, the controller 102 may detect that the user is approaching the position of caution by obtaining the information from the device through the communication line 105. For example, when the sensor 103 is an obstacle sensor having a function of detecting the presence or absence of an obstacle therearound by an image analysis or radar waves, the controller 102 may detect whether or not the user is approaching the obstacle in accordance with output of the sensor 103.

When the controller 102 detects that the user is approaching the position of caution (a state illustrated in FIG. 17B as "APPROACHING STEP"), the controller 102 changes the target control values of the attachment angles of the elastic member 4 and the viscous member 5 so as to increase the elasticity and viscosity exhibited by the shock absorber 1 and outputs the changed target control values to the servo device 6K and the servo device 6D (S103). The servo device 6K drives a servo motor disposed therein with power from the battery 104, thereby matching the attachment angle of the elastic member 4 with the target control value output from the controller 102. The servo device 6D drives a servo motor disposed therein with power from the battery 104, thereby matching the attachment angle of the viscous member 5 with the target control value output from the controller 102. Thus, the attachment angles of the elastic member 4 and the viscous member 5 match the target control values determined by the controller 102.

In order to avoid application of overloads to the servo device 6K and the servo device 6D, the controller 102 may change the target control values when no load is applied to the walking stick 100. A state in which no load is applied to the walking stick 100 refers to a state in which, for example, the user raises the walking stick 100 when the user takes a step forward. Whether or not the walking stick 100 is raised or not may be detected by, for example, the angle or acceleration of the walking stick 100 or by using a sensor switch or the like that detects a load applied to the walking stick 100

When the elasticity or the viscosity exhibited by the shock absorber 1 is increased, the walking stick 100 becomes stiff. Thus, the magnitude of shocks transmitted from the walking stick 100 is increased when the walking stick 100 is in contact with the ground. When the magnitude of shocks transmitted from the walking stick 100 is increased by contact of the walking stick 100 with the ground, the user of the walking stick 100 feels strange about the change and pays attention to a place in front of the walking stick 100. By paying attention to the place in front of the walking stick 100, the user of the walking stick 100 becomes aware of the presence of the step in front of the user (a state illustrated in FIG. 17C as "RECOGNITION OF STEP").

When the controller 102 detects that the user is not approaching the position of caution (a state illustrated in FIG. 17D as "PASSED STEP"), the controller 102 changes the target control values of the attachment angles of the elastic member 4 and the viscous member 5 back to initial values so as to set the elasticity and the viscosity exhibited by the shock absorber 1 to the initial states and outputs the changed target control values to the servo device 6K and the servo device 6D (S104). The servo device 6K drives the servo motor disposed therein with power from the battery 104, thereby matching the attachment angle of the elastic member 4 with the target control value output from the controller 102. The servo device 6D drives the servo motor disposed therein with power from the battery 104, thereby matching the attachment angle of the viscous member 5 with the target control value output from the controller 102. Thus, the attachment angles of the elastic member 4 and the viscous member 5 are set to the initial states, and the magnitude of the shock transmitted from the walking stick 100 when the walking stick 100 is in contact with the ground is returned to the original value.

With the walking stick 100 according to the above-described application example, various information may be transmitted to the user through the tactile sense. Accordingly, the user of the walking stick 100 may obtain various information through the tactile sense even when, for example, the eyesight and hearing of the user are failing and the user does not recognize information transmitted through a display screen or sound.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A shock absorber comprising:
   a shock absorbing member, being provided between a first member and a second member, having an outer circumferential surface, rotating around an axis provided between the first member and the second member while the outer circumferential surface faces a bottom surface of the first member and an upper surface of the second member, being free from contact at the outer circumferential surface in the vicinity of the bottom surface of the first member, and being in contact with an end portion of a member that is provided on the upper surface of the second member and moves back and forth with respect to the shock absorbing member; and
   a device that changes a rotation angle of the shock absorbing member least one of the elasticity and the viscosity against the member.

2. The shock absorber according to claim 1, wherein the shock absorbing member has at least one of elasticity and viscosity against a movement of the member, wherein each of the elasticity and viscosity changes in accordance with a rotation angle of the shock absorbing member around the axis, and wherein the device changes the rotation angle to adjust at least one of the elasticity and the viscosity against the member.

3. The shock absorber according to claim 2, wherein
   the shock absorbing member includes an elastic member formed of a plate spring,
   a plate surface of the plate spring corresponds to the outer circumferential surface, and
   the device includes an actuator for the elastic member that changes the rotation angle of the elastic member to adjust the elasticity of the elastic member against the member.

4. The shock absorber according to claim 2, wherein
   the shock absorbing member includes a viscous member formed of a plurality of materials having respective hardnesses different from one another; and
   the device includes an actuator for the viscous member that changes the rotation angle of the viscous member to adjust the viscosity of the viscous member against the member.

5. The shock absorber according to claim 2, wherein
   the shock absorbing member includes:
      an elastic member formed of a plate spring, a plate surface of the plate spring corresponding to the outer circumferential surface; and
      a viscous member formed of a plurality of materials having respective hardnesses different from one another; and
   the device includes:
      a first actuator that changes the rotation angle of the elastic member to adjust the elasticity of the elastic member against the member; and
      a second actuator that changes the rotation angle of the viscous member to adjust the viscosity of the viscous member against the member.

6. The shock absorber according to claim 4, wherein the viscous member is formed of the plurality of materials superposed with one another.

7. The shock absorber according to claim 4, wherein the viscous member has a groove along the outer circumferential surface, and the end portion of the member is engaged with the groove.

8. The shock absorber according to claim 1, wherein the shock absorbing member includes a plate spring having one end secured to a shaft of a portion which is provided around the axis and rotates with the shock absorbing member, and having an other end which is free.

9. The shock absorber according to claim 5, wherein one end of the plate spring is secured to a shaft of a portion which is provided around the axis and rotates with the shock absorbing member, and wherein an other end of the plate spring is free.

10. A shock absorber comprising:
    a shock absorbing member configured to be rotated around an axis and having an outer circumferential surface configured to be in contact with an end portion of a member that moves back and forth with respect to the shock absorbing member, the shock absorbing member having at least one of elasticity and viscosity against a movement of the member, each of the elasticity and viscosity changing in accordance with a rotation angle of the shock absorbing member around the axis; and a device that changes the rotation angle of the shock absorbing member to adjust at least one of the elasticity and the viscosity against the member, wherein the shock absorbing member includes:

an elastic member formed of a plate spring having a plate surface which is the outer circumferential surface, wherein one end of the plate spring is secured to a shaft of a portion; and a viscous member formed of a plurality of materials having respective hardnesses different from one another;

wherein the device includes:

a first actuator that changes the rotation angle of the elastic member to adjust the elasticity of the elastic member against the member; and a second actuator that changes the rotation angle of the viscous member to adjust the viscosity of the viscous member against the member.

\* \* \* \* \*